United States Patent
Renehan

(10) Patent No.: US 6,670,792 B1
(45) Date of Patent: Dec. 30, 2003

(54) ALTERNATOR REGULATION CIRCUIT HAVING PARALLEL FIELD COIL CURRENT RE-CIRCULATION

(75) Inventor: John F. Renehan, South Lyon, MI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/949,262

(22) Filed: Sep. 7, 2001

(51) Int. Cl.$^7$ ............... H02J 7/14; H02P 9/30
(52) U.S. Cl. ............... 322/28; 322/25; 322/22; 322/17
(58) Field of Search ............... 322/28, 25, 22, 322/17

(56) References Cited

U.S. PATENT DOCUMENTS

| | | | | |
|---|---|---|---|---|
| 4,314,193 A | | 2/1982 | Mortonson | 322/28 |
| 4,315,204 A | | 2/1982 | Sievers et al. | 322/28 |
| 4,322,667 A | * | 3/1982 | Ohba | 318/338 |
| 4,386,310 A | | 5/1983 | Sievers | 322/28 |
| 4,388,586 A | * | 6/1983 | Lamoth | 323/283 |
| 4,446,417 A | | 5/1984 | Fox et al. | 322/25 |
| 4,733,159 A | | 3/1988 | Edwards et al. | 323/282 |
| 4,839,575 A | | 6/1989 | MacFarlane | 322/25 |
| 4,882,531 A | | 11/1989 | Edwards et al. | 322/60 |
| 4,918,592 A | | 4/1990 | Shimizu | 363/50 |
| 4,973,896 A | * | 11/1990 | Shiga et al. | 322/28 |
| 5,013,995 A | | 5/1991 | Rashid | 322/25 |
| 5,038,094 A | | 8/1991 | Rashid | 322/28 |
| 5,173,654 A | | 12/1992 | Boella et al. | 322/25 |
| 5,210,480 A | | 5/1993 | Iwatani et al. | 322/28 |
| 5,225,764 A | | 7/1993 | Falater | 322/28 |
| 5,254,935 A | | 10/1993 | Vercesi et al. | 322/29 |
| 5,285,147 A | | 2/1994 | Rashid | 322/28 |
| 5,298,851 A | | 3/1994 | DeNardis | 322/28 |
| 5,397,991 A | * | 3/1995 | Rogers | 324/434 |
| 5,471,359 A | * | 11/1995 | Simpson et al. | 361/93.2 |
| 5,481,176 A | | 1/1996 | DeBiasi et al. | 322/7 |
| 5,528,148 A | * | 6/1996 | Rogers | 320/426 |
| 5,583,420 A | | 12/1996 | Rice et al. | 322/25 |
| 5,602,459 A | * | 2/1997 | Rogers | 320/15 |
| 5,610,499 A | * | 3/1997 | Rogers | 322/25 |
| 5,644,213 A | | 7/1997 | Renehan | 322/28 |
| 5,905,357 A | * | 5/1999 | Kawasaki | 320/104 |
| 5,907,233 A | | 5/1999 | Jabaji | 322/28 |
| 6,064,186 A | | 5/2000 | Pierret et al. | 322/28 |
| 6,148,258 A | * | 11/2000 | Boisvert et al. | 701/9 |
| 6,154,031 A | * | 11/2000 | Hughes | 324/322 |
| 6,184,661 B1 | | 2/2001 | Becker et al. | 322/25 |
| 6,188,203 B1 | | 2/2001 | Rice et al. | 322/25 |
| 6,194,877 B1 | | 2/2001 | Judge et al. | 322/28 |
| 6,215,277 B1 | | 4/2001 | Renehan | 320/117 |
| 6,466,024 B1 | * | 10/2002 | Rogers | 324/427 |
| 6,534,958 B1 | * | 3/2003 | Graber et al. | 322/11 |
| 6,586,914 B2 | * | 7/2003 | Garrigan et al. | 322/28 |

\* cited by examiner

*Primary Examiner*—Nicholas Ponomarenko
*Assistant Examiner*—Pedro J. Cuevas
(74) *Attorney, Agent, or Firm*—Ostrolenk, Faber, Gerb & Soffen, LLP

(57) ABSTRACT

Among the embodiments of the present invention is an apparatus that includes an alternator field coil, a driver coupled to the alternator field coil to provide excitation current thereto, and a recirculation circuit coupled to the alternator field coil. The recirculation circuit includes a unidirectional current device and a current sensing device electrically coupled in series. The driver is electrically coupled between a first electrical power supply node and the field coil, and the recirculation circuit is electrically coupled between the driver and a second electrical power supply node.

26 Claims, 3 Drawing Sheets

ALTERNATOR REGULATION CIRCUIT HAVING PARALLEL FIELD COIL CURRENT RE-CIRCULATION

BACKGROUND

The present invention relates to electrical circuitry, and more particularly, but not exclusively, relates to circuitry to regulate electrical power output by an alternator.

It is sometimes desired to sense current flow through selected conductive pathways of electricity generating devices. Of particular interest is the detection of electric current through the field coil of a vehicle alternator. Typically, during operation of an alternator, excitation current is supplied to the field coil through an electronically controlled driver. One proposed scheme for detecting field winding current is based on a special Field Effect Transistor (FET) driver with a dedicated current sense output. This output provides a signal proportional to the excitation current flowing through the special driver to the field coil. Unfortunately, such special drivers are often relatively expensive.

Another proposed scheme has been to detect current flowing to the field coil with a resistor placed in the excitation current pathway between the driver and the field coil, and/or in the excitation current pathway between the driver and a power supply rail. One drawback to this scheme is that excessive power loss can result unless the resistor has a relatively low resistance value. Such low resistance values can severely limit current detection accuracy. Moreover, because these schemes only measure excitation current levels, it is often difficult to determine the actual peak current flowing through the field coil.

Thus, a need remains for further advancements in this area of technology. The present invention meets this need.

SUMMARY OF INVENTION

One embodiment of the present invention includes unique electrical circuitry. Other embodiments include unique integrated circuits, apparatus, and methods for regulating an electrical power generating device.

A further embodiment of the present invention includes an electrical generator and a recirculation circuit electrically coupled to a component of the generator. The recirculation circuit includes a current sensing device electrically coupled in series with a unidirectional current device. In one form, the electrical generator component is a field coil of an alternator, the current sensing device is a sense resistor, and the unidirectional current device is a diode.

Yet a further embodiment of the present invention includes an alternator with a field coil and circuitry including a switching device, a current sensing device, and a unidirectional current device. The unidirectional current device is coupled in series with the current sensing device and is operable to route more electric current through the current sensing device during one state of the switching device than during a different state of the switching device.

Still a further embodiment of the present invention includes: providing circuitry comprising a switching device, a current sensing device, and a unidirectional device; controlling electrical current flow through an alternator field coil with the circuitry; and routing more electric current through the unidirectional current device and the current sensing device from the alternator field coil during one state of the switching device than during a different state of the switching device. In one form, the unidirectional current device includes a diode, the current sensing device includes a resistor, and the switching device includes a transistor. For this form, the one state corresponds to a nonconductive condition of the transistor and the different state corresponds to a conductive condition of the transistor. In this form, an integrated circuit is also included that can selectively activate the transistor to modulate excitation current supplied to the field coil, and includes a pair of differential inputs coupled across the resistor to generate a signal corresponding to current flow through the alternator field coil.

Another embodiment of the present invention comprises: establishing a first state of a driver to direct electric current flow through an alternator field coil along a first path; changing the driver from the first state to a second state to route electrical current flowing through the alternator field coil along a second path different than the first path; and sensing different nonzero levels of an electrical current with a current sensing device in the second path that is not included in the first path. A peak current through the alternator field coil can be determined through such sensing.

As used herein, "transistor device" broadly refers not only to a single transistor, but also to a transistor and one or more other electronic elements arranged to provide an active device that includes at least three terminals. By way of nonlimiting example, a transistor device includes multiple transistor combinations, such as two or more transistors coupled in parallel, the Darlington configuration, the Sziklai configuration, or such different multiple transistor configurations as would occur to those skilled in the art.

As used herein, "transistor" broadly refers to any transistor type, including, but not limited to, a Bipolar Junction Transistor (BJT) or Field Effect Transistor (FET); where FET types include the Junction Field Effect Transistor (JFET) variety or Insulated Gate Field Effect Transistor (IGFET) variety to name a few (it being understood that IGFETs encompass, but are not limited, any type of Metal Oxide Semiconductor Field Effect Transistor (MOSFET)).

One object of the present invention is to provide unique circuitry for an electrical power generation device.

Another object of the present invention is to provide a unique integrated circuit, apparatus, or method for regulating an electrical power generation device.

Further objects, embodiments, forms, features, advantages, benefits, and aspects of the present invention shall become apparent from the detailed description and drawings provided herewith.

DETAILED DESCRIPTION OF SELECTED EMBODIMENTS

Figure 1:
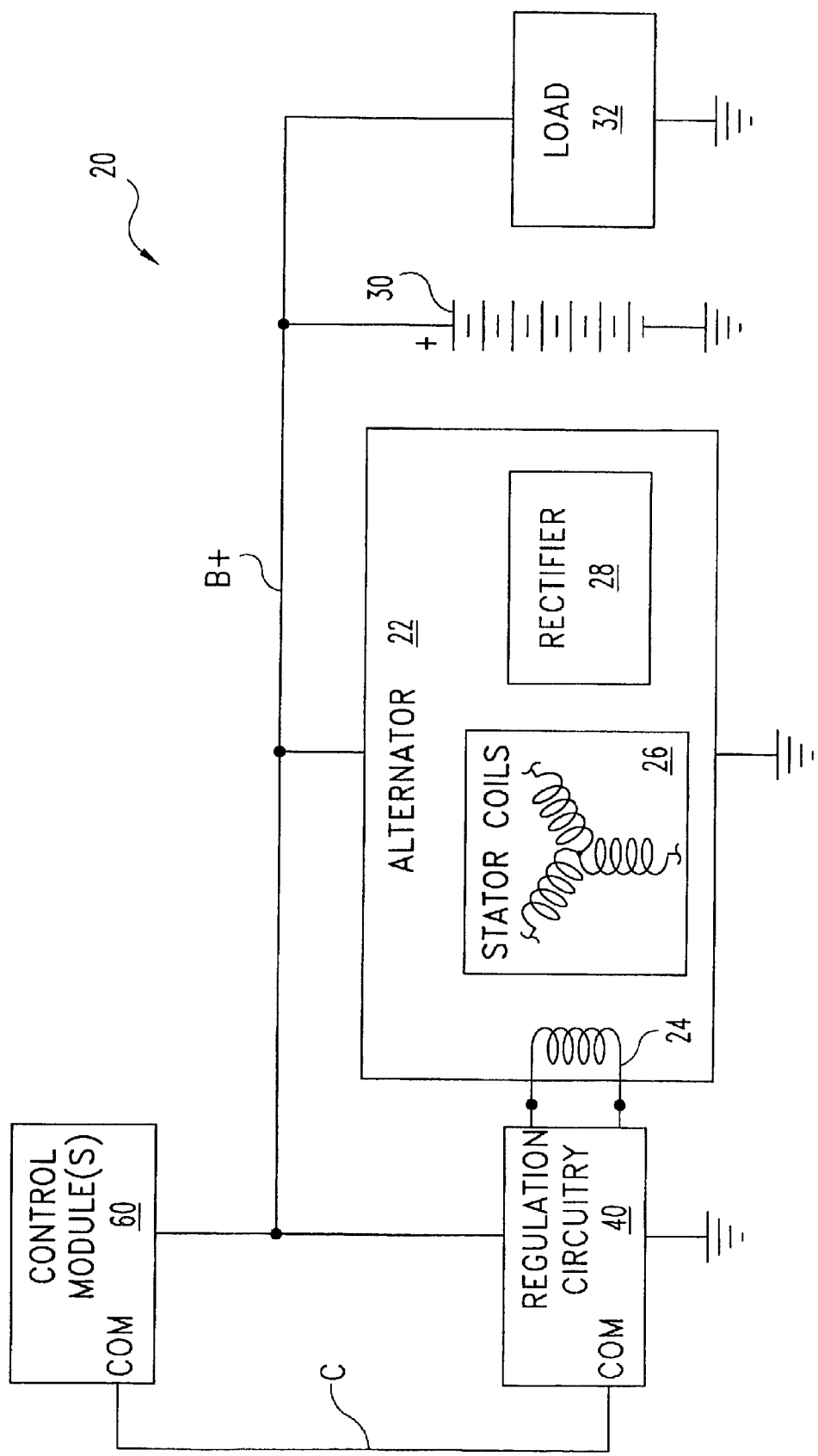
FIG. 1 is a schematic view of an electrical system of one embodiment of the present invention.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 schematically illustrates electrical system 20 of one embodiment of the present invention. System 20 includes alternator 22. Alternator 22 is of a standard type that includes a field winding or coil 24 mounted to a rotatable shaft and a number of stator coils 26. Typically, stator coils 26 are arranged to generate a three-phase electrical output when the shaft is rotated and electrical current is flowing through field coil 24. Rectifier 28 is also provided that converts the Alternating Current (AC) output of the stator coils 26 to a Direct Current (DC) output. This DC output is used to selectively provide electrical current to field coil 24 as will be more fully explained hereinafter.

Electrical power from alternator 22 is output on DC voltage bus B+ of electrical system 20. System 20 further includes electrical energy storage battery 30, electrical load 32, regulation circuitry 40, and one or more control modules 60 that are also electrically coupled to bus B+. Circuitry 40 regulates the electrical output of alternator 22 on bus B+. Collectively, system 20 can be of a type that is carried by a vehicle such as an automobile or truck where rotational mechanical power is provided to the shaft of alternator 22 by the vehicle engine (not shown). This rotational mechanical power is correspondingly converted to electrical power output on bus B+.

For this vehicular arrangement, battery 30 can be comprised of a number of electrochemical cells that are recharged by alternator 22 via bus B+, load 32 can be one or more subsystems or devices associated with the vehicle, and/or control modules(s) 60 can be of a type to control engine operation in one or more respects. In other embodiments, system 20 can be of a non-vehicle variety, can include a different type of electrical power generator instead of alternator 22, battery 30 may be differently arranged or may be absent, load 32 may be differently arranged or may be absent, and/or control module(s) 60 may be differently arranged or may be absent.

Figure 2:
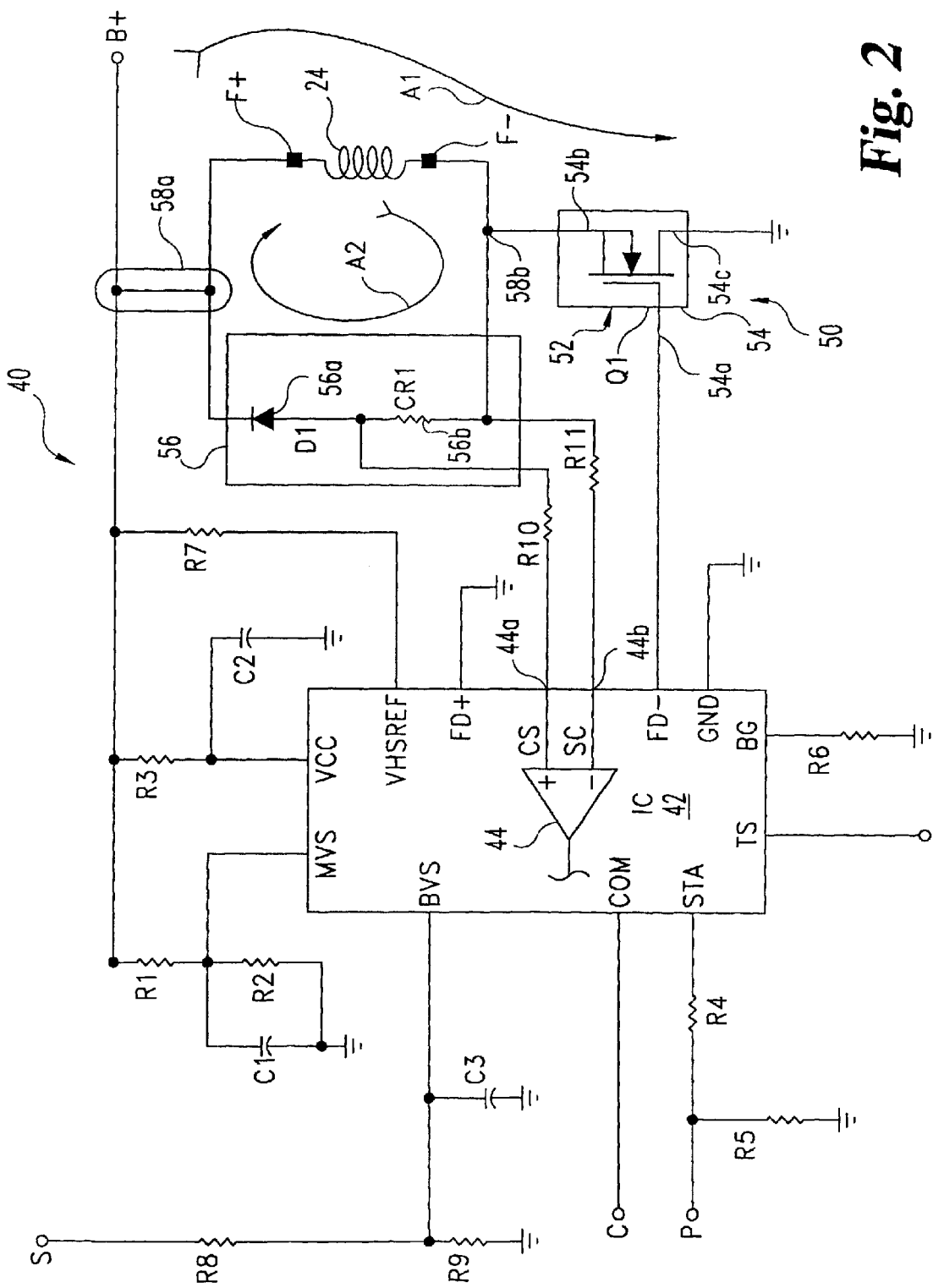
FIG. 2 is a schematic view illustrating the circuitry of FIG. 1 in greater detail.

FIG. 2 schematically illustrates circuitry 40 of FIG. 1 in greater detail. Circuitry 40 includes Integrated Circuit (IC) 42 coupled to various external components. Terminals VCC and GND of IC 42 provide standard electrical power supply connections to bus B+ and ground, respectively, via the filter provided by resistor R3 and capacitor C2. Terminal BG is a band gap reference voltage output that can be used in other external functions as appropriate, which is shown in FIG. 2 as being tied to ground via resistor R6. Terminal VHSREF provides a high-side voltage reference for current sensing and short circuit detection, being coupled to bus B+ by resistor R7. Terminals CS and SC provide inputs to detect current flow through field coil 24 as will be more fully described hereinafter. Terminal SC further provides an input for comparing voltage used to drive the field coil to an expected voltage to determine if a short circuit input may exist. Terminal STA receives an alternator stator phase input from input P via the voltage divider provided by resistors R4 and R5. Input P can be used for self-excitation of the regulation circuitry, alternator revolution detection, and/or fault detection. Terminal COM provides for two-way communication over bus C, which is also coupled to one or more control modules 60 shown in FIG. 1. In one embodiment, bus C is of a serial type arranged for digital communications. For one nonlimiting example pertinent to a vehicular embodiment, such communications could be in accordance with to the Local Interconnect Network (LIN) standard. However, in other embodiments, different protocols and/or formats can be utilized as would occur to those skilled in the art. Terminal TS provides for a temperature sensing device input that can be optionally used to sense temperature via a thermistor or comparable device (not shown).

IC 42 is arranged to regulate voltage output on bus B+ using either a low-side driver or high-side driver configuration. Circuitry 40 of FIG. 2 corresponds to a low-side driver configuration and circuitry 140 of FIG. 3 corresponds to a high-side driver configuration. Referring specifically to FIG. 2, IC 42 senses voltage provided by alternator 22 from bus B+ during its operation. The sensed voltage can be input via terminal MVS and/or terminal BVS of IC 42. Bus B+ is provided to terminal MVS via the voltage divider/filter arrangement of resistors R1 and R2 and capacitor C1. Terminal BVS is coupled to input S via the voltage divider/filter provided by resistors R8 and R9, and capacitor C3. The sensed voltage input to IC 42 via terminal MVS and/or BVS is internally compared to an internal voltage reference to determine if the voltage on bus B+ is at a desired voltage level or setpoint. To maintain this desired setpoint, IC 42 modulates current flow through field coil 24 of alternator 22 with field coil current regulation circuit 50.

Field coil current regulation circuit 50 includes a low-side field current driver 52. Driver 52 includes an active switching device 54 in the form of a Field Effect Transistor (FET) Q1. Transistor Q1 includes gate 54a, drain 54b, and source 54c. Drain 54b is coupled to field coil 24 and source 54c is coupled to electrical ground. Gate 54a is coupled to terminal FD− of IC 42. Terminal FD− provides a low-side Driver Signal (alternatively designated "signal DS") to gate 54a. When signal DS reaches an appropriate level, it "turns on" transistor Q1, placing it in an active state that provides an electrically conductive path from drain 54b to source 54c.

Field coil current regulation circuit 50 also includes recirculation circuit 56 electrically coupled in parallel with field coil 24. Recirculation circuit 56 includes unidirectional current device 56a electrically coupled in series with current sensing device 56b. Unidirectional current device 56a is in the form of diode D1 and current sensing device 56b is in the form of sense resistor CR1. Recirculation circuit 56 is connected to bus B+ at electrical node 58a in common with terminal F+ of field coil 24. Recirculation circuit 56 is also connected to electrical node 58b in common with terminal F− of field coil 24 and drain 54b of transistor Q1.

IC 42 includes differential amplifier 44 schematically illustrated in FIG. 2. Differential amplifier 44 includes a pair of differential inputs 44a and 44b corresponding to terminals CS and SC of IC 42, respectfully. For the illustrated embodiment, sense resistor CR1 of current sensing device 56b is coupled across differential inputs 44a and 44b by input resistors R10 and R11, respectively.

In operation, IC 42 generates signal DS in the form of a series of activating pulses with a duty cycle that varies as needed to provide the desired voltage of bus B+. In response to an activating pulse of signal DS, transistor Q1 "turns on," becoming active and causing excitation current to flow through field coil 24. This excitation current follows the excitation current pathway represented by arrow A1, which extends from bus B+ through field coil 24, and through transistor Q1 from drain 54b to source 54c at ground. When IC 42 changes the level of signal DS in a manner sufficient to cause deactivation, transistor Q1 "turns off," stopping the supply of excitation current to field coil 24 through driver 52. As the excitation current is reduced or stopped with transistor Q1, the inductive nature of field coil 24 results in a collapsing magnetic field. This collapsing magnetic field has the potential to generate undesirable reverse voltage spikes while transistor Q1 is inactive (nonconductive). To reduce this potential, recirculation circuit 56 is electrically coupled across field coil 24. The cathode/anode orientation of diode D1 of recirculation circuit 56 is arranged, such that diode D1 is reversed biased (nonconductive) when electrical current flows through transistor Q1 and field coil 24 along the excitation current pathway represented by arrow A1. In contrast, diode D1 is forward biased (conductive) in response to reverse voltage caused by the collapsing magnetic field of field coil 24. Correspondingly, diode D1 recirculates current induced in field coil 24 by the changing magnetic field along the recirculation current pathway represented by arrow A2 while transistor Q1 is inactive or "off" (nonconductive). This current recirculation not only can reduce the damage potential, but also can tend to average current flow through field coil 24.

Because unidirectional current flow is generally imposed by diode D1, substantial current from field coil 24 only flows through sense resistor CR1 during recirculation. As current flows through sense resistor CR1, a voltage develops across sense resistor CR1 and correspondingly between differential inputs 44a and 44b which is amplified by differential amplifier 44 to provide a corresponding current level signal, ISENSE. Signal ISENSE can be used by integrated circuit 42 in an analog form and/or digitized by IC 42 to provide a digital form. In one embodiment, the signal ISENSE is of a variable type that corresponds to different nonzero levels of current flow through sense resistor CR1 as current flows through recirculation circuit 56 from field coil 24. In other embodiments, signal ISENSE can be of a discrete, true/false type, representing only whether current flowing through current sensing device 56b and recirculation circuit 56 exceeds a given level. Information corresponding to signal ISENSE can be communicated to one or more control modules 60 via the COM terminal of IC 42. In one form, modules 60 include an engine control module that can be used to regulate operation of a vehicle engine in accordance with signal ISENSE. Alternatively or additionally, the generation of signal DS and/or other operations of IC 42 can be determined as a function of signal ISENSE.

It has been discovered that the power loss through sense resistor CR1 is relatively low compared to resistors used in the excitation current pathway of an alternator field coil. As a result, a comparatively higher resistance value can be used for sense resistor CR1, improving current measurement resolution. In one embodiment, sense resistor CR1 has a resistance of about 0.1 ohm; however, it should be understood that in other embodiments, a different resistance value could be used as would occur to those skilled in the art.

It has been further discovered that the measurement of a peak magnitude of electrical current flow through field coil 24 can be more readily measured with a current sensing device 56b in the recirculation pathway, as compared to excitation pathway detection devices. It should be understood that when the excitation current is cut-off with driver 52, the maximum current flow through field coil 24 typically occurs at or near this cut-off point. Because the magnitude of current through field coil 24 typically lags the duration of driver activation and/or there is usually variation in the duty cycle of signal DS, it is often difficult to determine the peak current through field coil 24 with a device in the excitation current pathway. However, with a current sensing device 56b in the recirculation path, the detection of peak current through field coil 24 can frequently be directly observed and timed relative to signal DS. It should also be recognized that for embodiments where a 100% duty cycle of signal DS is possible (such that driver 52 is always on), field coil current would not appreciably flow through recirculation circuit 56. Consequently, if current detection with current sensing device 56b is desired under such conditions, a slight variation in duty cycle could be implemented on a relatively infrequent basis to measure field coil current.

Figure 3:
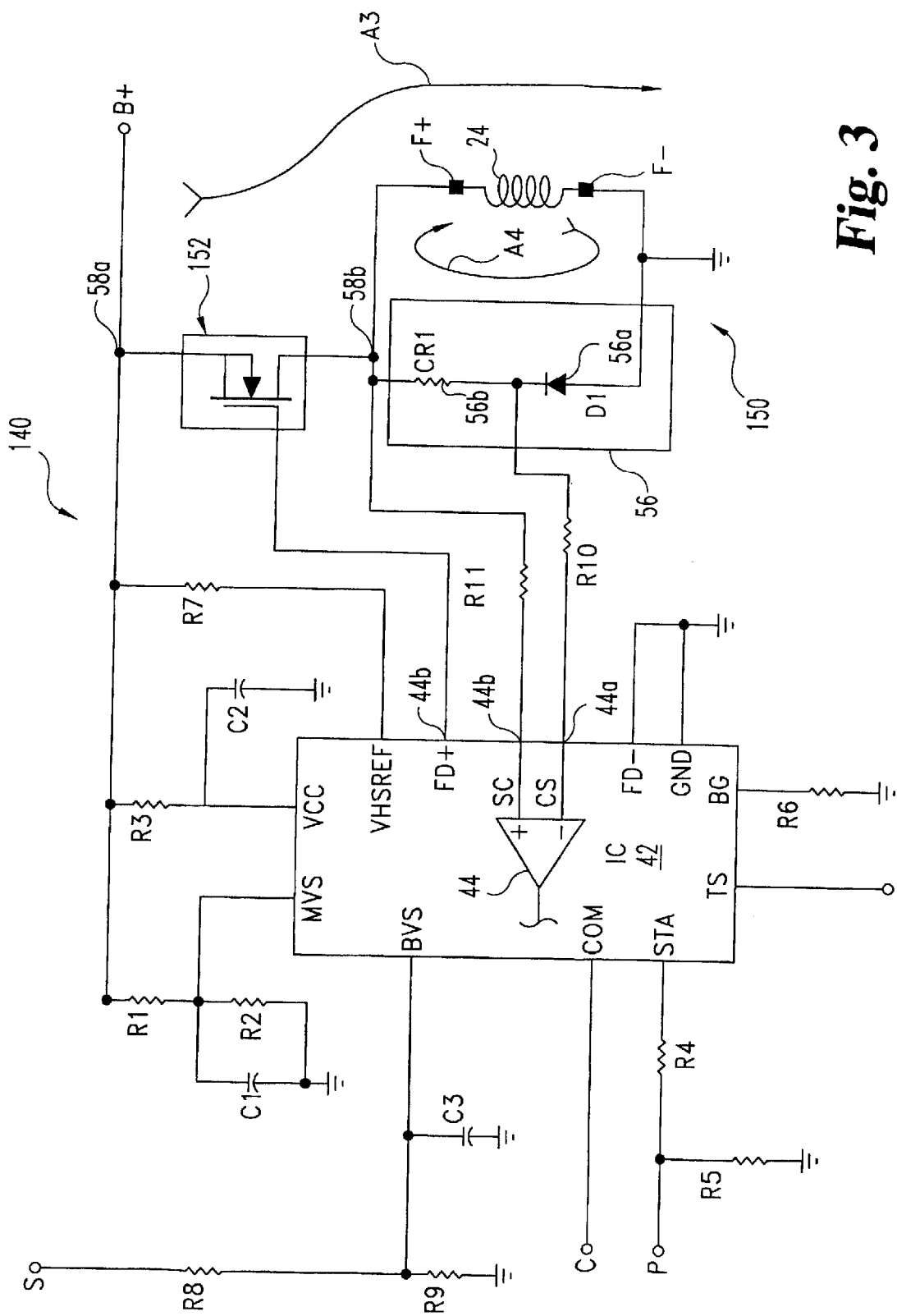
FIG. 3 is a schematic view illustrating another embodiment of the present invention.

FIG. 3 illustrates a high-side driver configuration in the form of circuitry 140 that is interchangeable with circuitry 40 in system 20 of FIG. 1. Notably, circuitry 140 includes components common to circuitry 40 which are designated by like reference numerals and characters. Circuitry 140 includes field coil current regulation circuit 150. Field coil current regulation circuit 150 includes a high-side field current driver 152 in the form of an FET switching device. Driver 152 is electrically coupled between nodes 58a and 58b, and is responsive to signal DS from terminal FD+ of IC 42. For high-side operation, signal DS is output by terminal FD+, and for low-side operation, signal DS is output by terminal FC−. Correspondingly, for circuitry 140, terminal FD− is grounded in contrast to circuitry 40 in which terminal FD+ is grounded. Field coil 24 of alternator 22 is electrically coupled between ground and node 58b in parallel with recirculation circuit 56. In circuitry 140, sense resistor CR1 and diode D1 of recirculation circuit 56 are electrically configured as described for circuitry 40; however, sense resistor CR1 is coupled across-terminals 44a and 44b of differential amplifier 44 in an opposite orientation relative to circuitry 40.

In operation, signal DS is provided to modulate current flow through field coil 24 by selectively causing excitation current to flow along the excitation pathway represented by arrow A3. When driver 152 is inactive, the collapsing magnetic field of field coil 24 causes current to flow through recirculation circuit 56 as represented by arrow A4. Accordingly, as in the case of circuitry 40, more current flows from field coil 24 through recirculation circuit 56 (including both unidirectional current device 56a and current sensing device 56b) when driver 152 is in an "off" or inactive state, than when driver 152 is in an "on" or active state. As a result, current through field coil 24 is measured with sense resistor CR1 in the recirculation pathway while driver 152 is inactive. Further, signal ISENSE can be generated by differential amplifier 44 for use in the control and regulation of various operations with IC 42, such as signal DS generation, and/or other devices, such as one or more control modules 60, as described in connection with circuitry 40.

Referring generally to FIGS. 1–3, IC 42 and/or any of the components of circuitry 40 or 140 can be mounted on a common substrate. IC 42 and one or more of the components comprising circuitry 40 or 140 can be provided in the form of a hybrid circuit module mounted to a common ceramic substrate, on a standard printed wiring board, or in such different arrangement as would occur to those skilled in the art. For one hybrid module embodiment, sense resistor CR1 can be of a thick film variety that may be statically trimmed as part of a mass production manufacturing process.

In other embodiments, a different resistor type and/or different resistor configuration can be used. By way of nonlimiting example, a network of two or more resistors, a rheostat, and/or potentiometer could be utilized to name just a few. Alternatively or additionally, other component(s)/ networks could be used including special purpose diodes, thermistors, magnetic field-based current detectors, electro-optic based current detectors, and/or such different components(s)/circuitry as would occur to those skilled in the art.

In other embodiments, the current sensing device of recirculation circuit 56 may not only vary, but also, or in the alternative, the unidirectional current device may be of a different form than a single diode D1. For example, multiple serial diodes, one or more transistor devices oriented to direct current in a single direction, one or more Silicon Controlled Rectifiers (SCRs), and the like can be used. Moreover, the orientation of sense resistor CR1 relative to diode D1 could be reversed in other embodiments. By way of nonlimiting example with respect to circuitry 40 and 140, diode D1 can be serially coupled between sense resistor CR1 and node 58b in contrast to the illustrated arrangement of sense resistor CR1 being serially coupled between node 58b and diode D1.

In still other embodiments, driver 52 can be comprised of other components besides, or in addition to an FET. For example, other transistor device types could be utilized as previously defined herein. In another example, a different type of switching device besides a transistor could be used including a solid state relay, optical relay, electrical mechanical relay, thyristor, and the like. For further embodiments, the detection of field coil current using a component in a recirculation circuit can be used in conjunction with other detection techniques including one or more devices in the excitation current pathway, and/or special FET devices.

Alternatively or additionally, the circuits provided by IC 42 can differ among various embodiments of the present invention. In one embodiment, IC 42 is provided in the form of an Application Specific Integrated Circuit (ASIC), providing flexibility to desired changes. In other embodiments, IC 42 can be of a hard-wired, dedicated type or a combination of dedicated and user-definable features. In still other embodiments, a combination of two or more integrated circuits and/or one or more discrete components are used instead of IC 42. For yet other embodiments, IC 42 may have more or fewer terminals, input/output features, and/or operational features. Alternatively or additionally, one or more components of circuitry 40 or 140 external to IC 42 can be incorporated in IC 42.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. An apparatus, comprising:
   an alternator field coil;
   a driver coupled to said alternator field coil to provide an excitation current thereto;
   a recirculation circuit coupled to said alternator field coil, said recirculation circuit including a unidirectional current device and a current sensing device electrically coupled in series; and
   wherein said driver is electrically coupled between a first electrical power supply node and said field coil, and said recirculation circuit is electrically coupled between said driver and a second electrical power supply node.

2. The apparatus of claim 1, wherein said unidirectional current device includes at least one diode, said current sensing device includes at least one resistor, and said driver includes at least one transistor.

3. The apparatus of claim 1, wherein said recirculation circuit is electrically coupled in parallel with said alternator field coil.

4. The apparatus of claim 1, further comprising circuitry to selectively activate said driver to modulate the excitation current provided to said alternator field coil, said circuitry including a pair of differential inputs coupled across said current sensing device.

5. An apparatus, comprising:
   an alternator including a field coil;
   a driver to provide excitation current to said field coil; and
   a recirculation circuit electrically coupled in parallel with said field coil, said recirculation circuit including a current sensing device electrically coupled in series with a unidirectional current device.

6. The apparatus of claim 5, wherein said unidirectional current device includes at least one diode, said current sensing device includes at least one resistor, and said driver includes at least one transistor.

7. The apparatus of claim 5, wherein said recirculation circuit is electrically coupled to said field coil and said driver by a first electrical node, said recirculation circuit and said field coil are coupled together by a second electrical node, and said second electrical node is common to electrical ground.

8. The apparatus of claim 5, wherein said recirculation circuit is electrically coupled to said field coil and said driver by a first electrical node, said recirculation circuit and said field coil are coupled together by a second electrical node, and said second electrical node is common to an electrical power supply bus different than electrical ground.

9. The apparatus of claim 5, further comprising:
   circuitry to sense voltage output by said alternator to regulate operation of said driver as a function of said voltage output; and
   a differential amplifier to provide a current level signal, said differential amplifier including a pair of differential inputs coupled across said current sensing device.

10. The apparatus of claim 9, further comprising a control module responsive to the current level signal.

11. An apparatus, comprising:
    an alternator including a field coil; and
    circuitry including a switching device, a current sensing device, and a unidirectional current device, said unidirectional current device being electrically coupled in series with said current sensing device and being operable to route more electric current through said current sensing device during an inactive state of said switching device than during an active state of said switching device.

12. The apparatus of claim 11, wherein said unidirectional current device includes at least one diode, said current sensing device includes at least one resistor, and said switching device includes at least one transistor.

13. The apparatus of claim 11, further comprising circuitry to sense voltage output by said alternator and regulate operation of said switching device as a function of said voltage and electrical current sensed with said current sensing device.

14. The apparatus of claim 11, wherein said switching device is electrically coupled between an electrical power supply node of said alternator and said field coil, and said switching device conducts more excitation current to said field coil during said active state than during said inactive state.

15. The apparatus of claim 11, wherein said unidirectional current device includes a diode, said current sensing device includes a resistor, and said switching device includes a transistor, said active state corresponds to a conductive condition of said transistor, said inactive state corresponds to a nonconductive condition of said transistor, and further comprising:

an integrated circuit electrically coupled to said resistor and said transistor, said integrated circuit including circuitry to selectively change state of said transistor to modulate excitation current supplied to said field coil and a pair of differential inputs coupled across said resistor to provide a current level signal; and a control module responsive to the current level signal, said control module being coupled to said integrated circuit.

16. A method, comprising:

providing circuitry including a switching device, a current sensing device, and a unidirectional device;

controlling electrical current flow through an alternator field coil with the circuitry; and routing more electric current through the unidirectional current device and the current sensing device from the alternator field coil during one state of the switching device than during a different state of the switching device.

17. The method of claim 16, wherein said switching device includes a transistor, and said controlling includes modulating current flow through the field coil in accordance with a signal provided to the transistor, and which further includes:

sensing a voltage level corresponding to a voltage supply output provided with the alternator field coil; and generating the signal with circuitry responsive to said voltage level.

18. The method of claim 17, wherein the transistor is nonconductive during the one state and the transistor is conductive during the different state.

19. The method of claim 16, wherein said routing includes:

flowing current in a recirculation current path through the alternator field coil, the unidirectional current device, and the current sensing device during the one state of the switching device; and flowing current in an excitation current path through the switching device and the alternator field coil during the different state of the switching device.

20. A method, comprising:

establishing a first state of a driver to direct electric current flow through an alternator field coil along a first path;

changing the driver from the first state to a second state to route electrical current flowing through the alternator field coil along a second path different than the first path; and sensing different nonzero levels of an electric current with a current sensing device in the second path that is not included in the first path.

21. The method of claim 20, wherein said establishing includes providing an activation signal to the switching device.

22. The method of claim 20, which includes:

determining a field coil current level signal from said sensing; and providing the field coil current level signal to a control module.

23. The method of claim 22, wherein said determining includes generating the field coil current level signal with a differential amplifier.

24. The method of claim 20, wherein the current sensing device includes a current sensing resistor and said switching device includes a transistor.

25. The method of claim 24, further comprising providing a diode in the second path to selectively direct current through the current sensing device.

26. The method of claim 24, which further includes determining a peak current through the alternator field coil based on said sensing.

* * * * *